United States Patent
Ernest

(10) Patent No.: US 11,468,271 B2
(45) Date of Patent: Oct. 11, 2022

(54) METHOD OF DATA PREDICTION AND SYSTEM THEREOF

(71) Applicant: Aiola Ltd., Herzeliya (IL)

(72) Inventor: Guy Ernest, Tel Aviv (IL)

(73) Assignee: AIOLA LTD., Herzeliya (IL)

( * ) Notice: Subject to any disclaimer, the term of this patent is extended or adjusted under 35 U.S.C. 154(b) by 372 days.

(21) Appl. No.: 16/835,615

(22) Filed: Mar. 31, 2020

(65) Prior Publication Data
US 2021/0303934 A1    Sep. 30, 2021

(51) Int. Cl.
| | |
|---|---|
| *G06K 9/62* | (2022.01) |
| *G06N 3/08* | (2006.01) |
| *G06N 3/04* | (2006.01) |
| *G06N 20/20* | (2019.01) |
| *G06N 20/00* | (2019.01) |

(52) U.S. Cl.
CPC ......... *G06K 9/6263* (2013.01); *G06K 9/6215* (2013.01); *G06N 3/0454* (2013.01); *G06N 3/0472* (2013.01); *G06N 3/08* (2013.01); *G06N 20/20* (2019.01); *G06N 20/00* (2019.01)

(58) Field of Classification Search
CPC .. G06K 9/6215; G06K 9/6227; G06K 9/6256; G06K 9/6271; G06K 9/6263; G06K 9/6262; G06K 9/6254; G06K 9/6277; G06K 9/6276; G06K 9/6265; G06K 9/6268; G06K 9/6292; G06N 3/0454; G06N 3/0472; G06N 3/08; G06N 20/20; G06N 20/00; G06N 3/0445; G06N 3/126; G06N 20/10; G06N 5/003; G06V 10/82
See application file for complete search history.

(56) References Cited

U.S. PATENT DOCUMENTS

| | | | |
|---|---|---|---|
| 10,614,381 B2 * | 4/2020 | Hoffman | G06N 20/00 |
| 10,698,967 B2 * | 6/2020 | Shen | G06F 16/337 |
| 10,984,423 B2 * | 4/2021 | Adjaoute | G06N 20/00 |

(Continued)

OTHER PUBLICATIONS

Liu, H. , Wang, W., Zhang, Y. , Gu, R., Hao, Y., Neural Matrix Factorization Recommendation for User Preference Prediction Based on Explicit and Implicit Feedback, 2022, Computational Intelligence and Neuroscience : CIN, 2022. doi:http://dx.doi.org/10.1155/2022/9593957 (Year: 2022).*

*Primary Examiner* — Lana N Le
(74) *Attorney, Agent, or Firm* — Browdy and Neimark, PLLC

(57) ABSTRACT

There is provided a system and method of data prediction. The method includes obtaining a hierarchical data structure comprising a plurality of layers, each including one or more nodes; obtaining one or more machine learning (ML) models each corresponding to a respective node of at least some of the nodes in at least a given layer, in response to a user's request of prediction related to a given node in the given layer; generating a prediction result using a given ML model corresponding to the given node; upon receiving the user's feedback, selecting one or more configuration parameters of the given ML model related to the feedback; updating the selected configuration parameters according to additional factors in the feedback, and re-training the given ML model to obtain a re-trained ML model,—and using the re-trained ML model to generate an updated prediction result to be sent to the user.

25 Claims, 5 Drawing Sheets

(56) References Cited

U.S. PATENT DOCUMENTS

| | | | |
|---|---|---|---|
| 2017/0185894 A1* | 6/2017 | Volkovs | G06N 3/0454 |
| 2021/0004706 A1* | 1/2021 | Riddle | G06Q 30/016 |
| 2021/0027206 A1* | 1/2021 | Monaghan | G06N 20/20 |
| 2021/0103876 A1* | 4/2021 | Petrosso | G06F 40/56 |
| 2022/0114643 A1* | 4/2022 | Raziperchikolaei | G06Q 30/0631 |

* cited by examiner

METHOD OF DATA PREDICTION AND SYSTEM THEREOF

TECHNICAL FIELD

The presently disclosed subject matter relates, in general, to the field of data prediction, and more specifically, to machine learning based data prediction.

BACKGROUND

With rapid development of industrial processes and computerization, enterprises and organizations are constantly facing challenges and changes from management to operations. Enterprise software is used by organizations to provide solutions in processes such as, e.g., product transaction, customer relationship management, human resources, accounting, enterprise resource planning etc. However, conventional enterprise software has its own drawbacks when it comes to efficiency, speed, scalability etc. For instance, it relies on human intervention, which may result in errors of input data, inadequate information, personal biases, etc., thus may affect the accuracy and efficiency of the system performance.

Machine learning technology has been recently employed to analyze enterprise data and predict likely outcomes, which may benefit organizations by automating the processes, making data-driven decisions, and improving the efficiency of organizational operations. However, current machine learning based systems have certain limitations, such as, e.g., shortage of training data, computation complexity, limitation of transparency of such systems, etc.

Thus there is a need in the art for an improved data prediction method.

GENERAL DESCRIPTION

In accordance with certain aspects of the presently disclosed subject matter, there is provided a computerized method of data prediction, comprising: obtaining a hierarchical data structure comprising a plurality of layers, each including one or more nodes, each node representative of a specific entity and being associated with data related to the specific entity; obtaining one or more machine learning (ML) models each corresponding to a respective node of at least some of the nodes in at least a given layer, wherein each of the ML models is previously trained during a training phase, using data associated with the respective node and a set of configuration parameters of the ML model, for prediction of events related to the specific entity represented thereby; in response to a user's request of prediction related to a given node in the given layer, generating a prediction result using a given ML model corresponding to the given node; upon receiving the user's feedback on the prediction result, indicating one or more additional factors to be considered during the prediction, selecting one or more configuration parameters from the set of configuration parameters of the given ML model related to the feedback; and updating the selected configuration parameters according to the additional factors and re-training the given ML model using a set of configuration parameters including the updated configuration parameters, giving rise to a re-trained ML model; and using the re-trained ML model to generate an updated prediction result to be sent to the user.

In addition to the above features, the method according to this aspect of the presently disclosed subject matter can comprise one or more of features (i) to (xi) listed below, in any desired combination or permutation which is technically possible:

(i). The hierarchical data structure can be generated by collecting data informative of one or more attributes characterizing different specific entities, aggregating the data into aggregated data in accordance with an aggregation rule defined by the user, and generating the hierarchical data structure based on the aggregated data.

(ii). The specific entity can be an entity related to an organization and is selected from a group comprising: product, customer, brand, department, group, channel, segment, source and one or more entities related to sales, marketing, supply chain, manufacture and distribution.

(iii). Each of the one or more ML models can be selected from a group comprising: statistical model, neural network, decision tree, support vector machine, regression model, and genetic model, or ensemble/combination thereof.

(iv). The method can further comprise, upon receiving the user's feedback on the prediction result, determining one or more selected nodes in the hierarchical data structure that are related to the feedback, wherein the updating comprises updating the selected configuration parameters of one or more ML models corresponding to the one or more selected nodes according to the additional factors, and the re-training comprises re-training the one or more ML models corresponding to the one or more selected nodes, giving rise to one or more re-trained ML models.

(v). The one or more selected nodes can be determined in accordance with a predetermined proximity relative to the given node.

(vi). The one or more selected nodes can include one or more neighboring nodes of the given node in the given layer that are connected to a mutual upper node in an upper layer and the mutual node in the upper layer.

(vii). The method can further comprise, in response to a user's request of prediction related to a upper node in a upper layer of the given layer, calculating a prediction result related to the upper node according to a prediction result related to one or more nodes in the given layer that are connected to the upper node.

(viii). The method can further comprise, in response to a user's request of prediction related to a lower node in a lower layer of the given layer, training a ML model corresponding to the lower node and training one or more ML models corresponding to one or more neighboring nodes of the lower node in the lower layer, the one or more neighboring nodes being connected to a mutual node in the given layer together with the lower node. The training of the ML model of the lower node and the one or more ML models of the neighboring nodes can be performed at least based on the set of configuration parameters of the ML model corresponding to the mutual node.

(ix). The method can further comprise, in response to a user's request of prediction related to the given node with respect to a related node in the hierarchical data structure, re-training the ML model corresponding to the given node taking into consideration the related node.

(x). The method can further comprise sending the updated prediction result to the user, and repeating the selecting, updating, re-training and using in response to receiving new feedback from the user on the updated prediction result.

(xi). The method can further comprise, in response to a user's request of prediction related to the given node, predicting one or more nodes which are likely to be requested by the user for prediction in future, and calculating one or more ML models corresponding to the predicted nodes.

In accordance with other aspects of the presently disclosed subject matter, there is provided a system of data prediction, the system comprising a processor and memory circuitry (PMC) configured to obtain a hierarchical data structure comprising a plurality of layers each including one or more nodes, each node representative of a specific entity and being associated with data related to the specific entity; obtain one or more machine learning (ML) models each corresponding to a respective node of at least part of the nodes in at least a given layer, wherein each of the ML models is previously trained during the training phase, using data associated with the respective node and a set of configuration parameters of the ML model, for prediction of events related to the specific entity represented thereby; in response to a user's request of prediction related to a given node in the given layer, generate a prediction result using a given ML model corresponding to the given node; upon receiving the user's feedback on the prediction result indicating one or more additional factors to be considered during the prediction, select one or more configuration parameters from the set of configuration parameters of the given ML model related to the feedback; and update the selected configuration parameters according to the additional factors and re-train the given ML model using a set of configuration parameters including the updated configuration parameters, giving rise to a re-trained ML model; and use the re-trained ML model to generate an updated prediction result to be sent to the user.

This aspect of the disclosed subject matter can comprise one or more of features (i) to (xi) listed above with respect to the method, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of data prediction, the method comprising: obtaining a hierarchical data structure comprising a plurality of layers each including one or more nodes, each node representative of a specific entity and being associated with data related to the specific entity; obtaining one or more machine learning (ML) models each corresponding to a respective node of at least part of the nodes in at least a given layer, wherein each of the ML models is previously trained during a training phase, using data associated with the respective node and a set of configuration parameters of the ML model, for prediction of events related to the specific entity represented thereby; in response to a user's request of prediction related to a given node in the given layer, generating a prediction result using a given ML model corresponding to the given node; upon receiving the user's feedback on the prediction result indicating one or more additional factors to be considered during the prediction, selecting one or more configuration parameters from the set of configuration parameters of the given ML model related to the feedback; and updating the selected configuration parameters according to the additional factors and re-training the given ML model using a set of configuration parameters including the updated configuration parameters, giving rise to a re-trained ML model; and using the re-trained ML model to generate an updated prediction result to be sent to the user.

This aspect of the disclosed subject matter can comprise one or more of features (i) to (xi) listed above with respect to the method, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
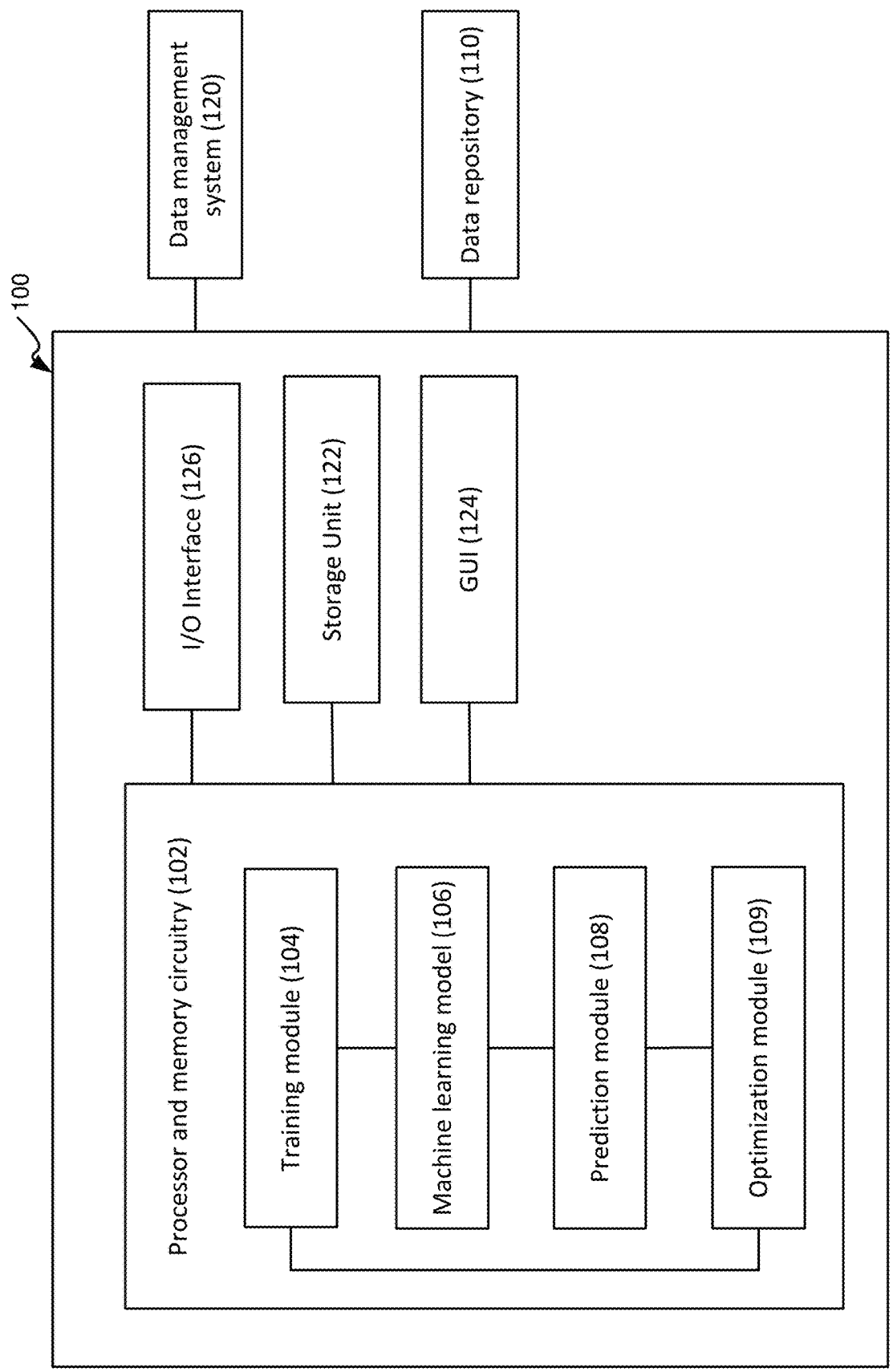
FIG. 1 illustrates a functional block diagram of a data prediction system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "generating", "training", "receiving", "selecting", "updating", "re-training", "using", "performing", "collecting", "aggregating", "calculating", "sending", "repeating", "predicting", "determining" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the system of data prediction and respective parts thereof disclosed in the present application.

The terms "non-transitory computer-readable memory" and "non-transitory computer-readable storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

Embodiments of the presently disclosed subject matter are not described with reference to any particular programming language. It will be appreciated that a variety of programming languages may be used to implement the teachings of the presently disclosed subject matter as described herein.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

In embodiments of the presently disclosed subject matter, one or more stages illustrated in the figures may be executed in a different order and/or one or more groups of stages may be executed simultaneously, and vice versa.

Bearing this in mind, attention is drawn to FIG. 1 illustrating a functional block diagram of a data prediction system in accordance with certain embodiments of the presently disclosed subject matter.

The system 100 illustrated in FIG. 1 is a computer-based system that can be used for data prediction related to an organization, a specific field/subject, etc. According to certain embodiments of the presently disclosed subject matter, the system 100 can be configured to dynamically create, based on machine learning technology, data prediction models using data of the organization, and use the prediction models to perform prediction for future events, as will be described below in further detail with reference to FIG. 2. System 100 is thus also referred to as a data prediction system or a prediction system in the present disclosure. System 100 can be operatively connected to one or more data management systems 120. The term "data management system" referred to herein should be expansively construed to cover any enterprise management system(s) (e.g., enterprise resource planning (ERP), customer relationship management (CRM), etc.) and/or an internal database of such systems which are configured to store and manage raw data and/or structured data related to organizational entities. In some embodiments, the system 100 can be further operatively connected to external data repositories 110 for storing and providing necessary data.

System 100 includes a processor and memory circuitry (PMC) 102 operatively connected to a hardware-based I/O interface 126. PMC 102 is configured to provide all processing necessary for operating the system 100 as further detailed with reference to FIG. 2 and comprises a processor (not shown separately in FIG. 1) and a memory (not shown separately in FIG. 1). The processor of PMC 102 can be configured to execute several functional modules in accordance with computer-readable instructions implemented on a non-transitory computer-readable memory or storage medium comprised in the PMC. Such functional modules are referred to hereinafter as comprised in the PMC.

The processor referred to herein can represent one or more general-purpose processing devices such as a microprocessor, a central processing unit, or the like. More particularly, the processor may be a complex instruction set computing (CISC) microprocessor, a reduced instruction set computing (RISC) microprocessor, a very long instruction word (VLIW) microprocessor, or a processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), a network processor, or the like. The processor is configured to execute instructions for performing the operations and steps discussed herein.

The memory referred to herein can comprise a main memory (e.g., read-only memory (ROM), flash memory, dynamic random access memory (DRAM) such as synchronous DRAM (SDRAM) or Rambus DRAM (RDRAM), etc.), and a static memory (e.g., flash memory, static random access memory (SRAM), etc.).

In certain embodiments, functional modules comprised in PMC 102 can include a training module 104, a machine learning module 106, a prediction module 108 and an optimization module 109 which are operatively connected therebetween. The PMC 102 can be configured to obtain, via I/O interface 126, a hierarchical data structure comprising a plurality of layers each including one or more nodes. Each node can be representative of a specific entity and is associated with data related to the specific entity. Details of the hierarchical data structure are described below with reference to FIGS. 2 and 3. The PMC 102 can be further configured to obtain, via I/O interface 126, one or more machine learning (ML) models each corresponding to a respective node of at least part of the nodes in at least a given layer of the hierarchical data structure. Each of the ML models can be previously trained (e.g., by the training module 104) during the training phase, using data associated with the respective node and a set of configuration parameters of the ML model, for prediction of events related to the specific entity represented thereby, as will be detailed below with reference to FIG. 2.

In inference stage/phase (also referred to as prediction phase, runtime phase, etc.), in response to a customer's request of prediction (or: prediction request) related to a given node in the given layer, the prediction module 108 can be configured to generate a prediction result using a given ML model corresponding to the given node. Upon receiving the customer's feedback on the prediction result indicating one or more additional factors to be considered during the prediction, the optimization module 109 can be configured to select one or more configuration parameters from the set of configuration parameters of the given ML model related to the feedback to be updated, and update the selected configuration parameters according to the additional factors. The training module 104 can be configured to re-train the given ML model using a set of configuration parameters including the updated configuration parameters, giving rise to a re-trained ML model. The re-trained ML model can be used to generate an updated prediction result to be sent to the customer. Operation of system 100, PMC 102 and the functional modules therein will be further detailed with reference to FIG. 2.

According to certain embodiments, the ML model 100 referred to herein can be implemented as various types of machine learning models, such as, e.g., statistical models, neural networks, decision trees, support vector machines, classification and regression models, and genetic models, or ensembles/combinations thereof etc. The learning algorithm used by the ML model can be any of the following: supervised learning, unsupervised learning, or semi-supervised learning, etc. The presently disclosed subject matter is not limited to the specific type or learning algorithm used by the ML model.

In some embodiments, the ML model 100 can be implemented as a deep neural network (DNN) which includes layers organized in accordance with respective DNN architecture. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture, or otherwise. Optionally, at least some of the layers can be organized in a plurality of DNN sub-networks. Each layer of DNN can include multiple basic computational elements (CE) typically referred to in the art as dimensions, neurons, or nodes.

Generally, CEs of a given layer can be connected with CEs of a preceding layer and/or a subsequent layer. Each connection between the CE of a preceding layer and the CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of a DNN can be initially selected prior to training, and can be further iteratively adjusted or modified during training to achieve an optimal set of weighting and/or threshold values in a trained DNN. After each iteration, a difference can be determined between the actual output produced by DNN and the target output associated with the respective training set of data. The difference can be referred to as an error value. Training can be determined to be complete when a cost function indicative of the error value is less than a predetermined value, or when a limited change in performance between iterations is achieved. Optionally, at least a part of the DNN subnetworks (if any) can be trained separately prior to training the entire DNN.

Each machine learning model has a set of parameters (such as, e.g., the weighting and/or threshold values of the DNN as described above) that are calculated as part of the training phase. In addition, each ML model also has a set of configuration parameters associated therewith which are configured for each node in the hierarchical data structure and are predetermined before the training phase, as will be described below in further detail.

A set of DNN input data used to adjust the weights/thresholds of a deep neural network is referred to hereinafter as a training set, or training dataset, or training data. As aforementioned, the training of the ML models can be performed by the training module 104 during the training phase, as will be detailed below with reference to FIG. 2.

It is noted that the above illustrated DNN architecture is for exemplary purposes only and is only one possible way of implementing the ML model, and the teachings of the presently disclosed subject matter are not bound by the specific model and architecture as described above.

According to certain embodiments, system 100 can comprise a storage unit 122. The storage unit 122 can be configured to store any data necessary for operating system 100, e.g., data related to input and output of system 100, as well as intermediate processing results generated by system 100. By way of example, the storage unit 122 can be configured to store raw data and/or metadata, the hierarchical data structure derived therefrom and/or other derivatives thereof. The storage unit 122 can also be configured to store the pre-trained ML models corresponding to respective nodes of the hierarchical data structure. Accordingly, these data and/or models can be retrieved from the storage unit 122 and provided to the PMC 102 for further processing.

In some embodiments, system 100 can optionally comprise a computer-based graphical user interface (GUI) 124 which is configured to enable user-specified inputs related to system 100. The user may be provided, through the GUI, with options of defining certain operation parameters. For instance, in some cases, the user can be presented with a visual representation of the hierarchical data structure corresponding to the organizational structure, and provide a request of prediction related to a given node through the GUI. The user may also view the operation results, such as, e.g., the prediction output, on the GUI, and can provide feedback on the prediction result through the GUI.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the system 100 illustrated in FIG. 1 can be implemented in a distributed computing environment, in which the aforementioned functional modules shown in FIG. 1 can be distributed over several local and/or remote devices, and can be linked through a communication network. It is further noted that in another embodiment, at least some of the ML models 106, storage unit 122 and/or GUI 124 can be external to the system 100 and operate in data communication with system 100 via I/O interface 126. By way of example, the ML models, or some thereof, can be pre-trained and stored externally and can be obtained and processed by system 100 via I/O interface 126. Alternatively, the respective functions of the ML models can, at least partly, be integrated with system 100, thereby facilitating and enhancing the functionalities of the system. By way of another example, the data repositories or storage unit therein can be shared with other systems or be provided by other systems, including third party equipment.

It is noted that the presently disclosed data prediction system 100 can be implemented in a computer or a computerized machine within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is described, the term "machine" shall also be taken to include any collection of machines that individually or jointly execute a set (or multiple sets) of instructions to perform any one or more of the methodologies discussed herein.

Figure 2:
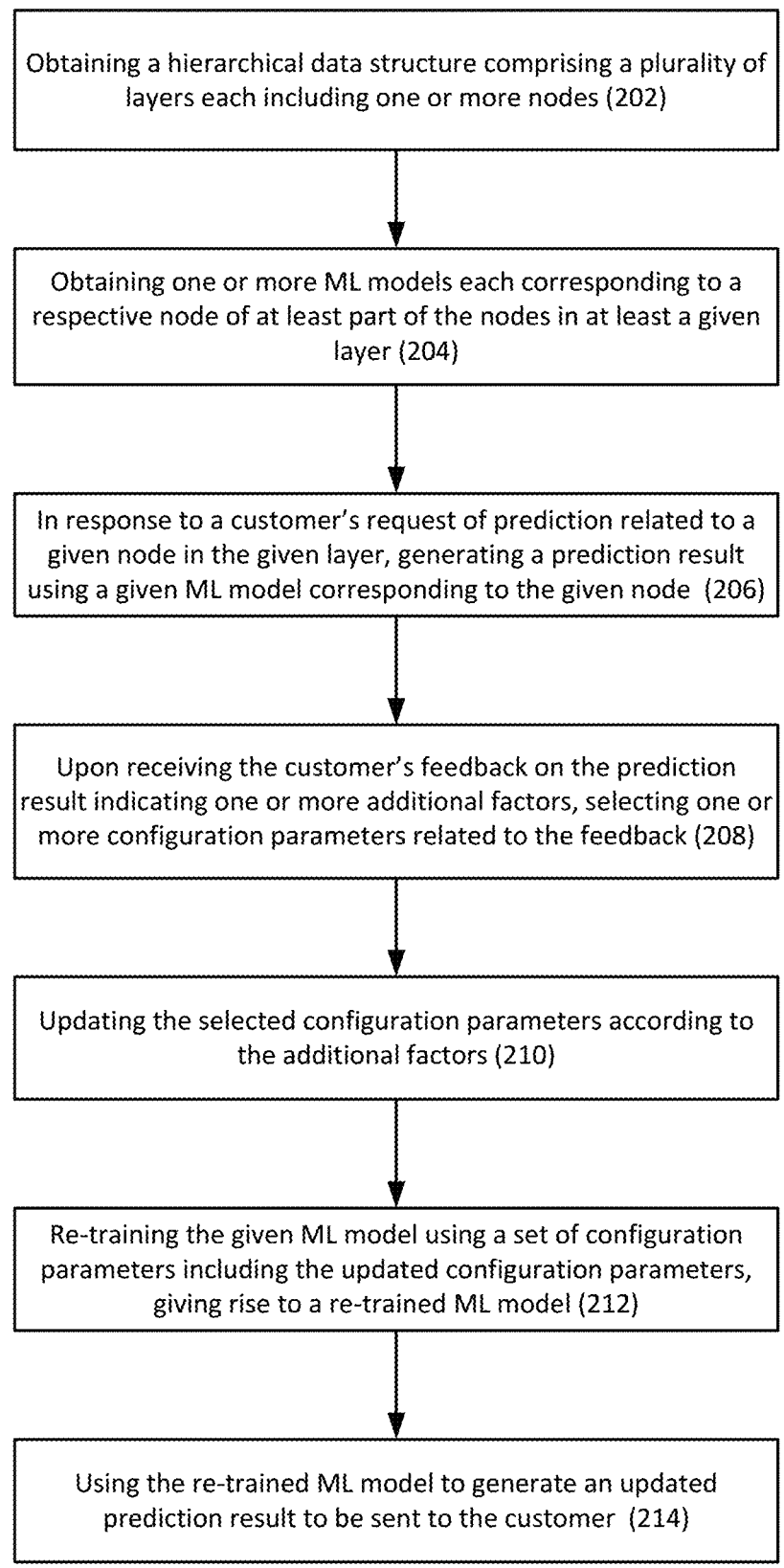
FIG. 2 illustrates a generalized flowchart of data prediction in accordance with certain embodiments of the presently disclosed subject matter.

While not necessarily so, the process of operation of system 100 can correspond to some or all of the stages of the methods described with respect to FIG. 2. Likewise, the methods described with respect to FIG. 2 and their possible implementations can be implemented by system 100. It is therefore noted that embodiments discussed in relation to the methods described with respect to FIG. 2 can also be implemented, mutatis mutandis as various embodiments of the system 100, and vice versa.

Referring to FIG. 2, there is illustrated a generalized flowchart of data prediction in accordance with certain embodiments of the presently disclosed subject matter.

A hierarchical data structure can be obtained (202) (e.g., by the PMC 102 via the I/O interface 126, or from the storage unit 122). The hierarchical data structure can comprise a plurality of layers, each including one or more nodes. Each node is representative of a specific entity and is associated with data related to the specific entity.

According to certain embodiments, the hierarchical data structure can refer to a data model in which the data are organized into a tree-like structure. The hierarchical data structure referred to herein can comprise a plurality of layers, each comprising one or more nodes. A layer (except for the first layer which comprises the root node) can be defined as all the nodes comprised therein having the same distance to the root node. Each node in the data structure is either a leaf node or non-leaf node. A leaf node is a node that does not have any subsequent branches or children (i.e., connections to subsequent nodes in a subsequent layer). The nodes are interconnected between neighboring layers. A node's parent is an upper node that is one step higher in the hierarchy (i.e. closer to the root node) and lying on the same branch. Neighboring nodes share the same parent node. The connected lower-level nodes of a given node are descendants or child nodes of the given node. It is to be noted that the terms of "upper" and "lower" are referred to in terms of the hierarchy of the data structure, according to how close the nodes are to the root node, and are thus not intended to limit the construction of the data structure in the present disclosure in any way.

According to certain embodiments, each node in the hierarchical data structure can represent a specific entity or an object related to an organization or a specific field/subject, etc. By way of example, the organization can be an enterprise, a company, an institute, or an industry etc. For instance, in cases where the organization is a company, the specific entity related thereto can be selected from a group comprising: product, customer, brand, department, group, channel, segment, source and one or more entities related to sales, marketing, planning, supply chain, manufacture and distribution, etc. By way of another example, the entities can also relate to a specific field or subject. For instance, the entities can represent different categories/classes/species in a specific medical research topic.

Figure 3:
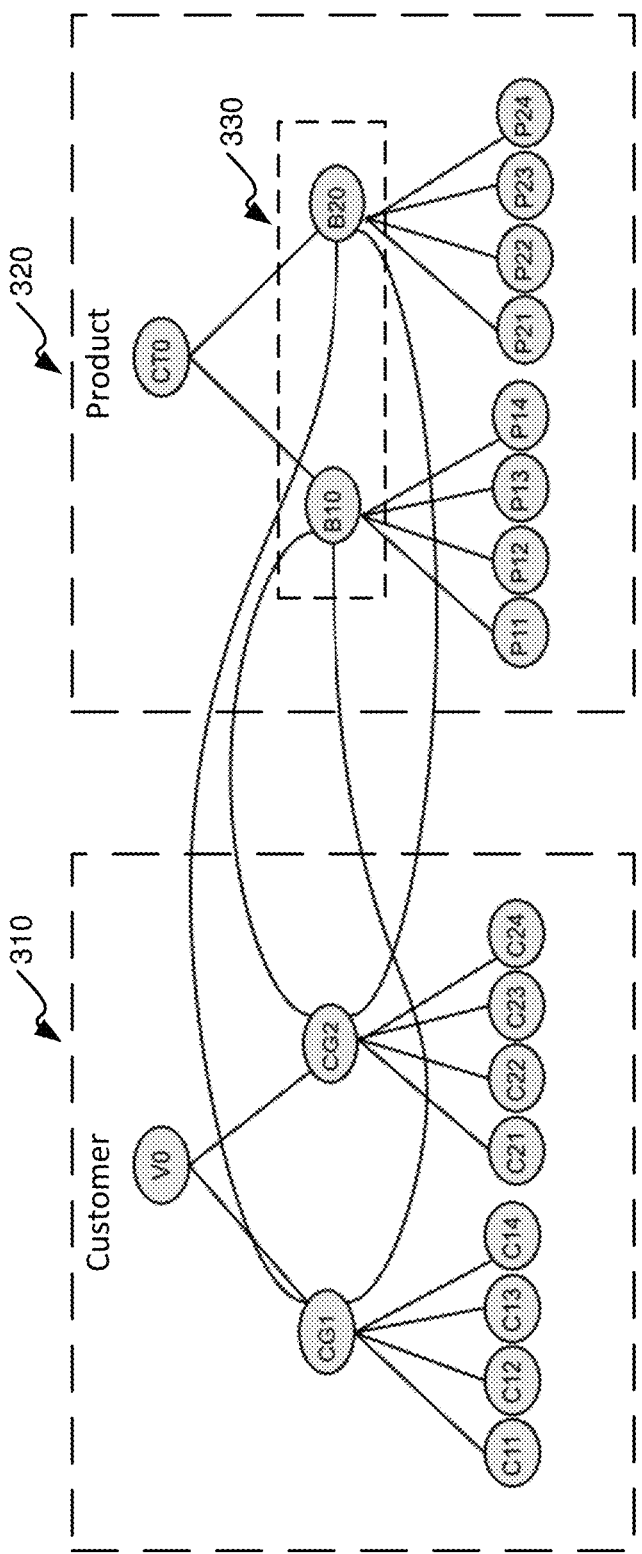
FIG. 3 exemplifies an example of a hierarchical data structure in accordance with certain embodiments of the presently disclosed subject matter.

Referring now to FIG. 3, there is illustrated an example of a hierarchical data structure in accordance with certain embodiments of the presently disclosed subject matter.

The hierarchical data structure as shown in FIG. 3 can be regarded as a composite tree structure comprising two sub-tree structures 310 and 320. The sub-tree 310 is generated based on customer data of an organization. Specifically, in sub-tree 310, the first layer comprises a root node denoted as VO representing a vertical-level customer, such as, e.g., a customer list of total retail stores. The second layer comprises two nodes denoted as CG1 and CG2 representing group-level customers, such as, two respective groups of customers under VO. For example, CG1 represents the customer group of all retail stores in North America, and CG2 represents the customer group of all retail stores in Europe. The third layer comprises leaf nodes respectively connected to CG1 and CG2, representing specific customers belonging to these two groups.

The sub-tree 320 is generated based on product data of the organization. Similarly, in sub-tree 320, the first layer comprises a root node denoted as CTO representing a certain category of products, such as, e.g., dairy products, bread products, soda drinks, etc. The second layer comprises two nodes denoted as B10 and B20 representing brand-level products, such as products produced by different companies. The third layer comprises leaf nodes respectively connected to B10 and B20, representing specific products belonging to these two brands.

The sub-trees 310 and 320 are interconnected between the nodes representative of specific customer-product relationships. By way of example, brand B10 is connected to CG1 and CG2 respectively, indicating that this brand of products are purchased by these two groups of customers.

It is to be noted that although the specific hierarchical data structure illustrated in FIG. 3 comprises two sub-tree structures, this is only for illustrative and exemplary purposes and should not be deemed as limiting the present disclosure in any way. Other forms of hierarchical data structures can be generated and used in addition to or in lieu of the above. For instance, each of the sub-trees can be regarded as an independent data structure in itself, irrespective of the connection with another sub-tree. In another example, one or more additional sub-trees representative of other entities can be added and connected to the present sub-trees in a similar manner.

According to some embodiments, the hierarchical data structure can be generated based on organizational data. By way of example, data informative of one or more attributes characterizing different entities of an organization can be collected (e.g. the attributes characterizing products can include the attributes kosher and/or containing sugar). The data can include raw data and/or metadata extracted from the data management system 120. These data can be in any suitable structure/format, such as, e.g., relational tables, lists, etc., and can include records informative of one or more attributes characterizing the entities of an organization.

The collected data can be aggregated/consolidated into aggregated data in accordance with an aggregation rule defined by a user (i.e., a user of the data prediction system 100). By way of example, the raw data can be enriched using the metadata related thereto. This can be done, e.g., by consolidating different relational tables based on the referencing keys shared between them. The hierarchical data structure can be generated based on the aggregated data.

According to certain embodiments, the hierarchical structure generated as such represents certain aspects of the organization in the real world. There are various ways of organizing real world entities (such as, e.g., products, customers, and other entities that are often assigned GUID (Global Unique Identification) in traditional database systems) into groups and sub-groups (e.g., categories and brands for products, demographic or geographic segments for customers, etc.). Therefore, each organization can have one or more different hierarchical structures, to better fit their different types of products and/or customers.

According to certain embodiments, there can be different aggregation rules defined according to different aspects corresponding to the user's specific requests. By way of example, a user may request prediction related to specific brands of products, in which case the raw data and metadata related to products and transactions can be aggregated according to a brand aspect, so that nodes at a certain layer in the generated hierarchical data structure can represent products at the requested brand level. By way of another example, another user may be interested in prediction related to specific categories of products (e.g., soda drinks), in which case the same data can be aggregated according to a category aspect so that certain nodes in the generated hierarchical data structure can represent products at the requested category level. In some cases, different aspects can be combined and used to aggregate the data and generate the hierarchical data structure. Thus, according to users' different requests, the same organizational data can be aggregated differently according to different aggregation rules, giving rise to different hierarchical data structures.

Each node in the hierarchical data structure generated as described above is associated with data related to the specific entity represented by the node. By way of example, the node B10 in FIG. 3 which represents brand-level products, e.g., all the products belonging the brand B10, is associated with aggregated data related to the products in the specific brand B10. Such data may include time-series of the transaction information of the products and related customer information, etc. Similarly, the leaf node P11 connected to B10 as a child node representing a specific product P11 belonging to brand B10, can be associated with aggregated data related to the specific product P11. The data associated with a node can be in any suitable data structure/format, such as, e.g., time-series, tables, lists, etc., including one or more records containing attributes informative of related information of the entity.

Continuing with the description of FIG. 2, one or more machine learning (ML) models, each corresponding to a respective node of at least part of the nodes in at least a given layer, can be obtained (e.g., by the PMC 102 via the I/O interface 126, or from the storage unit 122). Each of the ML models can be previously trained during a training phase, using training data associated with the respective node and a set of configuration parameters of the ML model. The ML model is trained for prediction of events related to the specific entity represented by the respective node.

According to certain embodiments, in some cases, the ML models can be pre-generated for at least some nodes in one or more layers in the hierarchical data structure, so that in the inference phase, upon receiving a user's prediction request related to one of such nodes, a corresponding trained ML model can be retrieved and ready to be used for performing the prediction as requested. For instance, the ML models can be pre-trained during a training phase using historical data associated with the respective entities. In such cases, the ML models can be pre-generated, e.g., either externally by an external system (i.e., external with respect to the data prediction system 100), and retrieved upon being requested, or internally within the data prediction system 100 (e.g., by the training module 104), and loaded when requested.

Alternatively, in some cases, a ML model for a specific node can be generated upon receiving a specific request from a user for a prediction related to the specific node in the inference phase. In such cases, the functionality of generation of the ML model, or at least part thereof, can be regarded as part of the data prediction system as presently disclosed herein.

As aforementioned, the ML models can be implemented as various types of machine learning models as exemplified above, and can be deemed as being comprised in the PMC 102. In one embodiment, the ML models can be implemented as deep learning neural networks (also referred to as deep neural networks, or DNNs). The general description of DNN architecture and implementation is described in detail above and thus will not be repeated here for purpose of brevity and conciseness of the description.

The ML models can be trained using different learning algorithms, such as, e.g., supervised learning, unsupervised learning, or semi-supervised learning. By way of example, the attributes in the historical data that characterize the respective entities, and/or additional features and patterns extracted therefrom, can be used to train the ML models. The training is based on a set of configuration parameters that configures the ML model. The prediction result can be compared with the ground truth so as to optimize the model parameters (e.g., weights and/or thresholds, etc.) of the ML models. The model parameters can be iteratively adjusted during training to achieve an optimal set of model parameter values in a trained ML model. Once a ML model is trained using the historical data associated with a respective node, the trained model can be used for prediction of events related to the specific entity represented by the node.

As aforementioned, the set of configuration parameters associated with the ML model are configured for each node in the hierarchical data structure and are predetermined before the training phase. According to certain embodiments, the set of configuration parameters can include a first subset of hyper-parameters of the ML model (such as, e.g., learning rate, number of layers in a DNN, number of clusters, etc.), and a second subset of parameters which are related to real world factors. The second subset of parameters can include, for instance, event factors, such as, e.g., holidays, promotions, elections, vacations, etc., policies and regulation factors, such as, e.g., sales limitation, etc., environmental factors, such as seasonality factors, pandemics, economic crises, heat waves, press coverage, etc. The configuration parameters can be modified and optimized based on the feedback of the users.

It is to be noted that the ML models can be pre-generated for at least some or all the nodes of one or more layers in the hierarchical data structure. The relevant nodes and layers can be predetermined, e.g., based on user interest and historical requests, etc. In some embodiments, at least a given layer can be selected for which ML models are generated for some or all the nodes thereof. In some cases, the selected layer can be an intermediate layer in the hierarchical data structure. One of the considerations can be that such an intermediate layer contains an appropriate amount of nodes, and the ML models generated therefor as well as prediction results thereof can be used for generating prediction results of nodes in other layers (e.g., nodes in preceding layers and subsequent layers), thereby improving the efficiency of the prediction performance. For instance, in the sub-tree structure 320 exemplified in FIG. 3, the selected layer can be the second layer 330 comprising two nodes of B10 and B20.

Once the hierarchical data structure and the one or more ML models corresponding to at least part of the nodes in at least a given layer are obtained, as described in blocks 202 and 204 of FIG. 2, upon receiving a user's prediction request related to a given node in the given layer in inference phase, a prediction result can be generated (206) (e.g., by the prediction module 108) using a given ML model corresponding to the given node.

By way of example, referring again to FIG. 3, assume that ML models are pre-generated for nodes in the second layer 330. Upon receiving a user's prediction request related to a given node (e.g., B10) in the second layer, the ML model corresponding to the given node B10 can be used to perform the prediction and generate a prediction result as requested. The prediction can be performed for a prediction time window/frame as requested. For instance, a specific request from a user can be "a prediction of milk sales in the next week", where "milk" is a node that aggregates a set of milk related products. In some cases, when the ML model associated with the given node is not recently trained and updated, the model can be re-trained based on current/recent data and/or part of historical data, as aggregated by the definitions of the node and the nodes connected to it, and the re-trained model can be used to perform the prediction.

Once the prediction result is provided to the user that requested the prediction, the user can review and provide feedback on the prediction result. By way of example, the user's feedback can indicate one or more additional factors that should have been considered during the prediction. The additional factors are real world factors and can include one or more of the following: event factors, such as, e.g., holidays, promotions, elections, vacations, etc., policies and regulation factors, such as, e.g., sales limitation, etc., environmental factors, such as seasonality factors, pandemics, economic crises, heat waves, press coverage, etc. These factors can be used to improve the accuracy of the ML model. For instance, one feedback on the prediction result of the above exemplified request can include a holiday factor, such as, e.g., "Next month is the Jewish holiday of Shavuot," which could potentially increase the sales of dairy products during the prediction time frame. Another feedback can include a promotion factor, such as, e.g., "A promotion on milk products with 15% discount is planned for next week", which will supposedly also affect the sales of dairy products.

Upon receiving the user's feedback on the prediction result, one or more configuration parameters can be selected (208) (e.g. by the optimization module 109) from the set of configuration parameters of the given ML model related to the feedback. In the case of the above exemplified feedback, the parameters in the second subset of the configuration parameters that are relevant to the events of holidays or promotions, can be selected.

The selected configuration parameters can be updated (210) (e.g., by the optimization module 109) according to the additional factors, and the given ML model can be re-trained (212) (e.g., by the training module 104) using a set of configuration parameters including the updated configuration parameters, giving rise to a re-trained ML model. The re-training can be performed in a similar manner as described above with reference to the training of the ML models. The re-trained ML model can be used (214) (e.g., by the prediction module 108) to generate an updated prediction result to be sent to the user.

It is to be noted that in some cases, both the first subset and the second subset of configuration parameters can be affected by the user's feedback. For instance, in cases where more factors in the second subset are affected by the feedback, certain parameters in the first subset, such as, e.g., the number of layers, should also be updated so as to adapt to the changes. By way of another example, when the user's feedback indicates a change of granularity of prediction, data points are modified which also affects certain parameters in the first subset, such as, e.g., the number of layers, etc.

According to certain embodiments, optionally, upon receiving the user's feedback on the prediction result, one or more selected nodes in the hierarchical data structure that are related to the feedback can be determined (e.g., by the optimization module 109), in addition to the selection of configuration parameters related to the feedback. In such cases, the selected configuration parameters of the one or more ML models corresponding to the one or more selected nodes can be updated according to the additional factors indicated in the feedback, and the one or more ML models corresponding to the one or more selected nodes are all re-trained, giving rise to one or more re-trained ML models.

In some embodiments, the one or more selected nodes can be determined in accordance with a predetermined proximity relative to the given node. By way of example, the proximity can refer to a distance between any other node and the given node. For instance, the proximity for selecting the one or more nodes can be predetermined as selecting one or more neighboring nodes of the given node in the given layer that are connected to a mutual upper node in an upper layer as well as the mutual node in the upper layer. In some cases, the proximity can refer to a weighted distance between any other node and the given node, where the weight of each step between two nodes can be determined based on certain factors, such as, e.g., the level of the node, the number of connected nodes, the context of the nodes, the ML models corresponding thereto, the received feedback, etc.

One of the considerations in such cases is that some of the nodes in the data structure are closely related and the feedback of one node sometimes can apply to other nodes as well. By selecting one or more nodes relevant to the feedback of a given node, and re-training the ML models of the selected nodes, in addition to re-training the ML model of the given node, the overall performance of the ML models in the hierarchical structure can be improved, e.g., through scattered feedback across the nodes and the users of the system.

Figure 4:
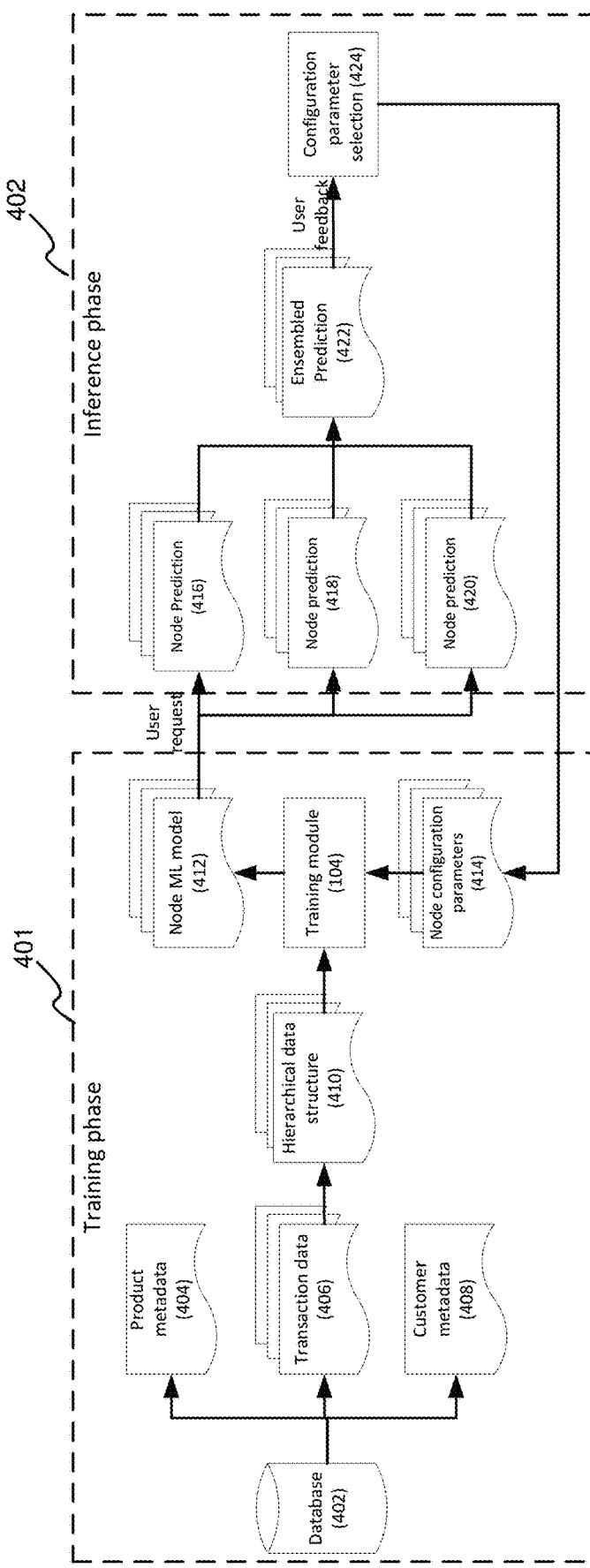
FIG. 4 illustrates a schematic diagram of an exemplary data prediction process in accordance with certain embodiments of the presently disclosed subject matter.

Referring now to FIG. 4, there is illustrated a schematic diagram of an exemplary data prediction process in accordance with certain embodiments of the presently disclosed subject matter.

For illustrative purposes, the process is divided into training phase 401 and inference phase (also referred to as prediction phase) 402. In the training phase 401, raw data and metadata including, e.g., product metadata 404, transaction data 406 and customer metadata 408 can be collected from an internal database 402. For instance, these data can be in in the form of relational tables, and can include records informative of one or more attributes characterizing the entities of product, transaction and customer of the organization. The collected data can be aggregated in accordance with a specific aggregation rule defined by the user and the aggregated data can be used to generate a hierarchical data structure 410 (such as, e.g., the data structure illustrated in FIG. 3).

Assume that a selected layer for which ML models are generated for some or all the nodes thereof is the second layer 330 in the sub-tree structure 320 of FIG. 3. Using the training module 104 as described in FIG. 1, a ML model 412 can be generated for each node in the selected layer. The ML model 412 is trained using historical data related to a respective node and a set of configuration parameters 414 of the ML model of the node. Therefore, ML model for B10 and ML model for B20 are generated.

In inference phase 402, prediction is performed when receiving a user request. For instance, user U1 sends a request of prediction related to node B10. The ML model for B10 can be used to generate a prediction result 416 for B10 in response to the user's request. In some cases, more than one ML model can be associated with a given node. Each model is created and trained based on different configuration parameters. For example, one model can be trained with focus on seasonality factors, while a different model can put more weight on event data. Thus more than one prediction result can be generated corresponding to different models and parameters. As illustrated, three prediction results 416, 418 and 420 are generated for B10. These prediction results can be ensembled to provide an ensembled prediction result 422. Upon reviewing the prediction result or the ensembled prediction result, the user may provide feedback, e.g., there will be a promotion for products belonging to B10 during the prediction time frame. Relevant configuration parameters can be selected (424) from the set of configuration parameters 414 and the selected configuration parameters are updated and used by training module 104 for re-training the ML model 412. In some cases, different configuration parameters can be selected and updated to address the same feedback, therefore the re-training can be performed according to differently updated configuration parameters, giving rise to different updated prediction results. These updated prediction results can be ensembled to be sent to the user.

There are now described several additional examples of using the presently disclosed data prediction system in the context of the exemplified hierarchical data structure illustrated in FIG. 3 in accordance with certain embodiments of the presently disclosed subject matter.

According to certain embodiments, in response to a user's request of prediction related to a upper node in a upper layer of a given layer, a prediction result related to the upper node can be calculated according to a prediction result related to one or more nodes in the given layer that are connected to the upper node.

By way of example, a user U2 can send a request of prediction related to node CTO, which is the root node of the sub-tree 320 and in a upper layer of the selected layer 330. Since ML models are only pre-generated for nodes in the selected layer 330, there is no ready ML model associated with node CTO. In such cases, the prediction result related to CTO can be calculated as a sum of the prediction results related to nodes B10 and B20. For instance, if CTO represents milk products, B10 represents all milk products belonging to brand B10, and B20 represents all milk products belonging to brand B20, thus when receiving a user request of "prediction of sales of milk products in the next month", a prediction result can be obtained by performing a first prediction of "sales of B10 products in the next month" for node B10 using the ML model thereof performing a second prediction of "sales of B20 products in the next month" for node B20 using the ML model thereof, and summing the two prediction results to obtain the result in response to the requested prediction.

According to certain embodiments, in response to a user's request of prediction related to a lower node in a lower layer of the given layer, a ML model corresponding to the lower node can be trained, and one or more ML models can be trained corresponding to one or more neighboring nodes of the lower node in the lower layer. The one or more neighboring nodes are connected to a mutual node in the given layer together with the lower node (i.e., they share the same upper node). Training of the ML model and the one or more ML models can be carried out at least based on the set of configuration parameters of the ML model corresponding to the mutual node. In some cases, the training of the ML model for the lower node can be also based on the configuration parameters of one or more neighboring nodes of the lower node, in addition to the configuration parameters of the mutual node.

By way of example, a user U3 can send a request of prediction related to node P12, which is a lower node in a lower layer of the selected layer 330. Since the ML models are only pre-generated for nodes in the selected layer 330, there is no ML model associated with node P12 at the time of receiving the request. In such cases, a ML model for node P12 is created and trained, and, in addition, ML models for the neighboring nodes P11, P13 and P14, which share the same upper node B10 with the requested node P12, are also created and trained. The training of these ML models is based on at least the set of configuration parameters of the ML model of B10 (i.e., the mutually connected upper node).

One of the considerations for training the ML models for the additional neighboring nodes (e.g., P11, P13 and P14 in the present example) is that since the neighboring nodes share a mutual upper node, there may be certain central constraints/restrictions/conditions associated with the mutual node which are relevant for prediction of some or all of the connected lower nodes. One example of such constraints can be, e.g., a sales limitation of X units for all products in this brand. Therefore, when training a model and making a prediction for a requested lower node, it may affect prediction of the other neighboring nodes. Therefore, by performing training of all the relevant nodes, taking into consideration the configuration parameters of the mutual upper node, it can share model parameters across the nodes, thereby compensating for the drawbacks caused by the sparsity of the data associated with the lower nodes, and providing a more accurate prediction.

Continuing with the present example, if the user U3 receives the prediction result of node P12, and provides feedback indicating additional factors to be considered for the prediction, the ML models of P12 and the neighboring nodes, i.e., P11, P13 and P14, will all be re-trained, and the re-trained ML model of P12 will be used to generate an updated prediction result to be sent to the user U3. In addition, the ML model of B10 will also be re-trained and the updated ML model will be used to generate an updated prediction result to be sent to user U1, who requested that prediction in the recent past. The sum of the prediction results of B10 and B20 will be re-calculated and sent to user U2 as an updated prediction result to the previous request.

According to further embodiments, in response to a user's request of prediction related to the given node with respect to a related node in the hierarchical data structure, the ML model corresponding to the given node can be retrained taking into consideration the related node.

By way of example, a user U4 can send a request of prediction related to node B10 with respect to node CG2. As can be seen from FIG. 3, CG2 is a node in the sub-tree 310 and is related to B10 via the connection there between. The layer of CG1 and CG2 represents customers at group level. For instance, CG1 represents the CG1 group of customers. The request of U4 requires a prediction of sales of B10 products with customers CG2. Upon receiving this request, the ML model of B10 is re-trained with split to CG1 and CG2. The re-trained ML model related to CG1 is used to perform the prediction and provide the prediction result to user U4.

Upon receiving the prediction result, user U4 can provide feedback with additional factors, and the ML model of B10, as well as the ML model of B20 which is the neighboring node of B10, are retrained with split to CG1 and CG2. The re-trained B10 model related to CG1 is used to obtain an updated prediction result for user U4.

Figure 5:
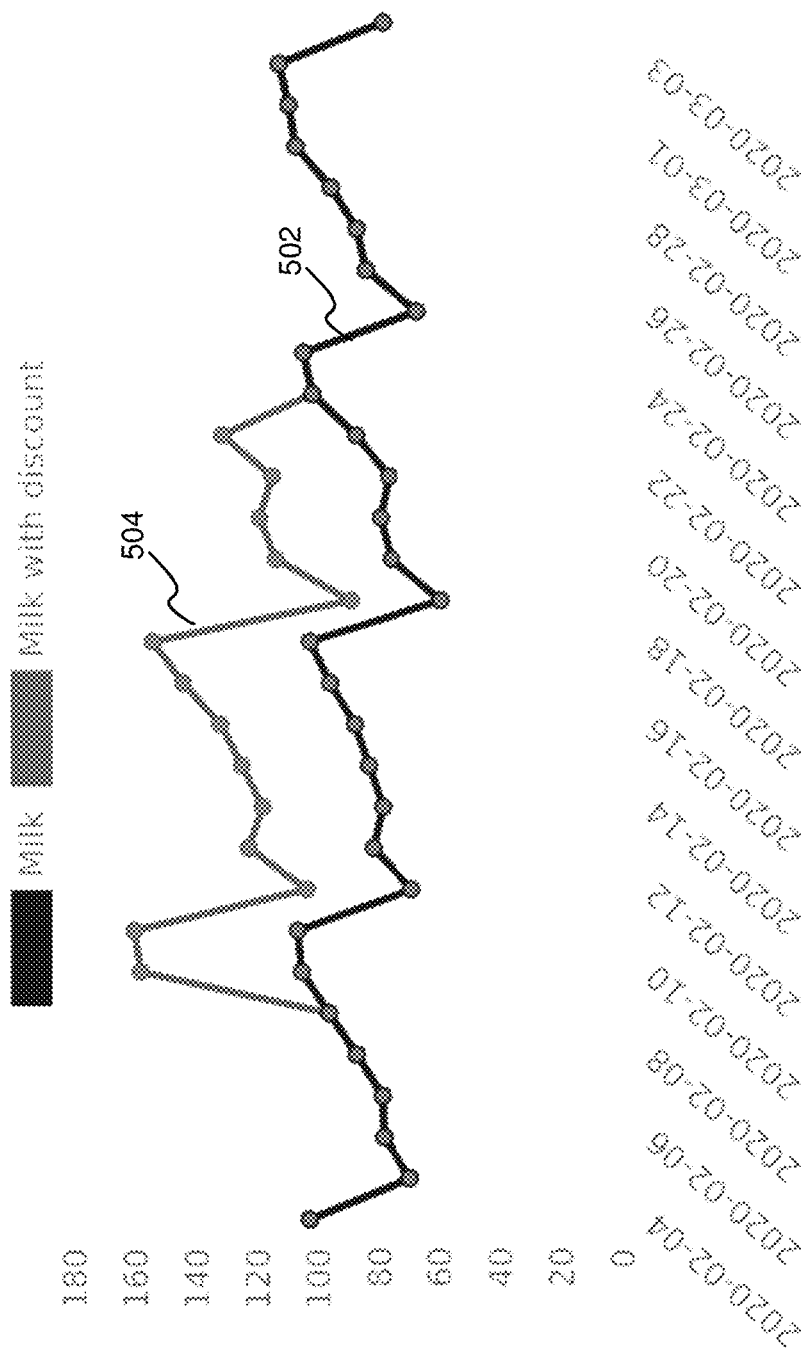
FIG. 5 illustrates an example of a visual representation of a prediction result and an updated prediction result in accordance with certain embodiments of the presently disclosed subject matter.

Referring now to FIG. 5, there is illustrated an example of a visual representation of a prediction result and an updated prediction result in accordance with certain embodiments of the presently disclosed subject matter.

Upon receiving a specific request from a user to request "a prediction of milk sales in the next month", a prediction result as illustrated in graph 502 is generated. After reviewing the prediction result, the user provides a feedback indicating a promotion factor, e.g., "a promotion of milk products with 15% discount is planned for two weeks in the next month". The ML is re-trained, taking into consideration such feedback, by updating selected configuration parameters related to the feedback, and an updated prediction result is generated using the re-trained ML model, as illustrated in graph 504. As can be seen, the updated prediction result reflects an increase of sales of milk products in the two weeks which is affected by the promotion factor.

According to certain embodiments, the selection of configuration parameters, updating of the selected parameters, retraining the ML model and using the re-trained ML model to get an updated prediction result described with reference to blocks 208-214 in FIG. 2 can be repeated one or more times in response to receiving new feedback from the user on the updated prediction result.

In response to a user's request of prediction related to the given node, one or more nodes can be predicted, which are likely to be requested by the user for prediction at future dates. One or more ML models can be generated/calculated corresponding to the predicted nodes. By way of example, a user has started to use the data prediction system, and has requested a prediction for a specific node that matches the relevant node in the organization chart of that user. Upon receiving the prediction result, the user shares it with his peers and managers, encouraging them to use the system, and thus generating similar requests on adjacent nodes. For instance, the adjacent nodes can include the neighboring nodes and the upper node, and/or additional nodes within a certain distance. By predicting nodes with high likelihood to be requested and pre-generating the ML models thereof, the availability and response time of the system can be improved, thereby avoiding unnecessary consumption of computation power in pre-calculating ML models for nodes which were not requested.

It is to be noted that the hierarchical data structure, the ML models and the training and re-training thereof with respect to the related nodes in the structure, is described herein for illustrative and exemplified purposes, and should not be regarded as limiting the present disclosure in any way. Other suitable data structures, data models and/or training and re-training methods usable for achieving the purpose of data prediction, can be used in addition to, or in lieu of the above.

Among advantages of certain embodiments of the data prediction process as described herein is that, by selectively updating configuration parameters according to user's feedback in runtime, and optionally, selecting relevant nodes in the hierarchical data structure that are related to the feedback, and re-training the ML model (possibly also ML models for the relevant nodes), data prediction is performed in a selective and precise manner, thereby improving efficiency of the prediction system and accuracy of the prediction outcome.

The technical advantages can be further enhanced by performing the selection and updating across relevant nodes in the same layer, or different layers, based on the interconnections in the hierarchical data structure, as described above. The data prediction system as described herein can be used for different applications of different departments, organizations and institutes, such as, e.g., sales, trade, marketing, manufacturing, planning, finance, as well as procurement, logistics and research related tasks, etc.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

The invention claimed is:

1. A computerized method of data prediction, the method performed by a processor and memory circuitry (PMC), the method comprising:
    obtaining a hierarchical data structure comprising a plurality of layers each including one or more nodes, each node representative of a specific entity and being associated with data related to the specific entity;
    obtaining one or more machine learning (ML) models each corresponding to a respective node of at least part of the nodes in at least a given layer, wherein each of the ML models is previously trained during training phase, using data associated with the respective node and a set of configuration parameters of the ML model, for prediction of events related to the specific entity represented thereby;

in response to a user's request of prediction related to a given node in the given layer, generating a prediction result using a given ML model corresponding to the given node;

upon receiving the user's feedback on the prediction result indicating one or more additional factors to be considered during the prediction, selecting one or more configuration parameters from the set of configuration parameters of the given ML model related to the feedback; and updating the selected configuration parameters according to the additional factors and re-training the given ML model using a set of configuration parameters including the updated configuration parameters, giving rise to a re-trained ML model; and using the re-trained ML model to generate an updated prediction result to be sent to the user.

2. The computerized method according to claim 1, wherein the hierarchical data structure is generated by collecting data informative of one or more attributes characterizing different specific entities, aggregating the data into aggregated data in accordance with an aggregation rule defined by the user, and generating the hierarchical data structure based on the aggregated data.

3. The computerized method according to claim 1, wherein the specific entity is an entity related to an organization and is selected from a group comprising: product, customer, brand, department, group, channel, segment, source and one or more entities related to sales, marketing, supply chain, manufacture and distribution.

4. The computerized method according to claim 1, wherein each of the one or more ML models is selected from a group comprising: statistical model, neural network, decision tree, support vector machine, regression model, genetic model and a combination thereof.

5. The computerized method according to claim 1, further comprising, upon receiving the user's feedback on the prediction result, determining one or more selected nodes in the hierarchical data structure that are related to the feedback, wherein the updating comprises updating the selected configuration parameters of one or more ML models corresponding to the one or more selected nodes according to the additional factors, and the re-training comprises re-training the one or more ML models corresponding to the one or more selected nodes, giving rise to one or more re-trained ML models.

6. The computerized method according to claim 5, wherein the one or more selected nodes are determined in accordance with a predetermined proximity relative to the given node.

7. The computerized method according to claim 6, wherein the one or more selected nodes include one or more neighboring nodes of the given node in the given layer that are connected to a mutual upper node in an upper layer and the mutual node in the upper layer.

8. The computerized method according to claim 1, further comprising, in response to a user's request of prediction related to a upper node in a upper layer of the given layer, calculating a prediction result related to the upper node according to a prediction result related to one or more nodes in the given layer that are connected to the upper node.

9. The computerized method according to claim 1, further comprising, in response to a user's request of prediction related to a lower node in a lower layer of the given layer, training a ML model corresponding to the lower node, and training one or more ML models corresponding to one or more neighboring nodes of the lower node in the lower layer, the one or more neighboring nodes being connected to a mutual node in the given layer together with the lower node, wherein the training of the ML model of the lower node and the one or more ML models of the neighboring nodes is performed at least based on the set of configuration parameters of the ML model corresponding to the mutual node.

10. The computerized method according to claim 1, further comprising, in response to a user's request of prediction related to the given node with respect to a related node in the hierarchical data structure, re-training the ML model corresponding to the given node, taking into consideration the related node.

11. The computerized method according to claim 1, further comprising sending the updated prediction result to the user, and repeating the selecting, updating, re-training and using in response to receiving new feedback from the user on the updated prediction result.

12. The computerized method according to claim 1, further comprising, in response to a user's request of prediction related to the given node, predicting one or more nodes which are likely to be requested by the user for prediction at future dates, and calculating one or more ML models corresponding to the predicted nodes.

13. A computerized system of data prediction, the system comprising a processor and memory circuitry (PMC) configured to:

obtain a hierarchical data structure comprising a plurality of layers, each including one or more nodes, each node representative of a specific entity and associated with data related to the specific entity;

obtain one or more machine learning (ML) models each corresponding to a respective node of at least part of the nodes in at least a given layer, wherein each of the ML models is previously trained during training phase, using data associated with the respective node and a set of configuration parameters of the ML model, for prediction of events related to the specific entity represented thereby;

in response to a user's request of prediction related to a given node in the given layer, generate a prediction result using a given ML model corresponding to the given node;

upon receiving the user's feedback on the prediction result indicating one or more additional factors to be considered during the prediction, select one or more configuration parameters from the set of configuration parameters of the given ML model related to the feedback; and update the selected configuration parameters according to the additional factors, and re-training the given ML model using a set of configuration parameters including the updated configuration parameters, giving rise to a re-trained ML model; and use the re-trained ML model to generate an updated prediction result to be sent to the user.

14. The computerized system according to claim 13, wherein the PMC is further configured to generate the hierarchical data structure by collecting data informative of one or more attributes characterizing different specific entities, aggregating the data into aggregated data in accordance with an aggregation rule defined by the user, and generating the hierarchical data structure based on the aggregated data.

15. The computerized system according to claim 13, wherein the specific entity is an entity related to an organization and is selected from a group comprising: product, customer, brand, department, group, channel, segment, source and one or more entities related to sales, marketing, supply chain, manufacture, and distribution.

16. The computerized system according to claim 13, wherein each of the one or more ML models is selected from a group comprising: statistical model, neural network, decision tree, support vector machine, regression model, genetic model and a combination thereof.

17. The computerized system according to claim 13, wherein the PMC is further configured to, upon receiving the user's feedback on the prediction result, determine one or more selected nodes in the hierarchical data structure that are related to the feedback, wherein the PMC is further configured to update the selected configuration parameters of one or more ML models corresponding to the one or more selected nodes according to the additional factors, and re-train the one or more ML models corresponding to the one or more selected nodes, giving rise to one or more re-trained ML models.

18. The computerized system according to claim 17, wherein the one or more selected nodes are determined in accordance with a predetermined proximity relative to the given node.

19. The computerized system according to claim 18, wherein the one or more selected nodes include one or more neighboring nodes of the given node in the given layer that are connected to a mutual upper node in an upper layer and the mutual node in the upper layer.

20. The computerized system according to claim 13, wherein the PMC is further configured to, in response to a user's request of prediction related to an upper node in an upper layer of the given layer, calculate a prediction result related to the upper node according to a prediction result related to one or more nodes in the given layer that are connected to the upper node.

21. The computerized system according to claim 13, wherein the PMC is further configured to, in response to a user's request of prediction related to a lower node in a lower layer of the given layer, train a ML model corresponding to the lower node, and training one or more ML models corresponding to one or more neighboring nodes of the lower node in the lower layer, the one or more neighboring nodes being connected to a mutual node in the given layer together with the lower node, wherein the training of the ML model of the lower node and the one or more ML models of the neighboring nodes is performed at least based on the set of configuration parameters of the ML model corresponding to the mutual node.

22. The computerized system according to claim 13, wherein the PMC is further configured to, in response to a user's request of prediction related to the given node with respect to a related node in the hierarchical data structure, re-train the ML model corresponding to the given node taking into consideration the related node.

23. The computerized system according to claim 13, wherein the PMC is further configured to send the updated prediction result to the user, and repeat the selecting, updating, re-training and using in response to receiving new feedback from the user on the updated prediction result.

24. The computerized system according to claim 13, wherein the PMC is further configured to, in response to a user's request of prediction related to the given node, predict one or more nodes which are likely to be requested by the user for prediction at future dates, and calculating one or more ML models corresponding to the predicted nodes.

25. A non-transitory computer readable storage medium tangibly embodying a program of instructions that, when executed by a computer, cause the computer to perform a method of data prediction, the method comprising:
   obtaining a hierarchical data structure comprising a plurality of layers each including one or more nodes, each node representative of a specific entity and being associated with data related to the specific entity;
   obtaining one or more machine learning (ML) models, each corresponding to a respective node of at least part of the nodes in at least a given layer, wherein each of the ML models is previously trained during a training phase, using data associated with the respective node and a set of configuration parameters of the ML model, for prediction of events related to the specific entity represented thereby;
   in response to a user's request of prediction related to a given node in the given layer, generating a prediction result using a given ML model corresponding to the given node;
   upon receiving the user's feedback on the prediction result indicating one or more additional factors to be considered during the prediction, selecting one or more configuration parameters from the set of configuration parameters of the given ML model related to the feedback; and
   updating the selected configuration parameters according to the additional factors, and re-training the given ML model using a set of configuration parameters including the updated configuration parameters, giving rise to a re-trained ML model; and
   using the re-trained ML model to generate an updated prediction result to be sent to the user.

* * * * *